(12) United States Patent
Bivans

(10) Patent No.: US 11,924,811 B2
(45) Date of Patent: Mar. 5, 2024

(54) SECURE WIRELESS COMMUNICATION OF ROBOTIC SAFETY STATE INFORMATION

(71) Applicant: Fort Robotics, Inc., Philadelphia, PA (US)

(72) Inventor: Nathan Bivans, Philadelphia, PA (US)

(73) Assignee: Fort Robotics, Inc., Philadelphia, PA (US)

( * ) Notice: Subject to any disclaimer, the term of this patent is extended or adjusted under 35 U.S.C. 154(b) by 117 days.

(21) Appl. No.: 17/192,657

(22) Filed: Mar. 4, 2021

(65) Prior Publication Data

US 2021/0282117 A1     Sep. 9, 2021

Related U.S. Application Data

(60) Provisional application No. 62/985,241, filed on Mar. 4, 2020.

(51) Int. Cl.
| | | |
|---|---|---|
| *H04W 72/04* | (2023.01) | |
| *B25J 9/16* | (2006.01) | |
| *G05B 19/042* | (2006.01) | |
| *H03M 13/29* | (2006.01) | |
| *H04L 1/00* | (2006.01) | |
| *H04W 12/03* | (2021.01) | |

(52) U.S. Cl.
CPC .......... *H04W 72/04* (2013.01); *B25J 9/1689* (2013.01); *G05B 19/0423* (2013.01); *H03M 13/2906* (2013.01); *H04L 1/0061* (2013.01); *H04W 12/03* (2021.01); *G05B 2219/25257* (2013.01)

(58) Field of Classification Search
None
See application file for complete search history.

(56) References Cited

U.S. PATENT DOCUMENTS 5,974,529 A * 10/1999 Zumkehr .............. G06F 9/3005
                                                  714/E11.178
11,086,336 B1 * 8/2021 Bolotski .............. G05D 1/0225
(Continued)

FOREIGN PATENT DOCUMENTS

WO     2007115272 A1    10/2007
WO     2018144560 A1    8/2018

OTHER PUBLICATIONS

PCT International Search Report and Written Opinion, PCT Application No. PCT/US21/20911, dated Jun. 1, 2021, 12 pages.
(Continued)

*Primary Examiner* — Jeffrey M Rutkowski
*Assistant Examiner* — Mehedi S Aley
(74) *Attorney, Agent, or Firm* — Run8 Patent Group, LLC; Peter Miller; Brian T. Chew

(57) ABSTRACT

A system generates, by a first source microcontroller, a first data packet comprising a payload and a first error code, the payload indicating a safety state of a robot. The first source microcontroller transmits the data packet from the first source microcontroller to a second source microcontroller. The second source microcontroller generates a second data packet that includes the payload, the first error code and a second error code. The second source microcontroller transmits the second data packet to a sink microcontroller, wherein the sink microcontroller recovers the payload based on at least one of the first error code and the second error code.

17 Claims, 11 Drawing Sheets

(56) References Cited

U.S. PATENT DOCUMENTS

| | | | |
|---|---|---|---|
| 2004/0015691 A1* | 1/2004 | Collette | H04L 12/56 |
| | | | 713/161 |
| 2004/0078116 A1 | 4/2004 | Hashimoto et al. | |
| 2005/0091501 A1* | 4/2005 | Osthoff | G06F 21/51 |
| | | | 713/160 |
| 2007/0160083 A1* | 7/2007 | Un | H04L 1/0083 |
| | | | 370/470 |
| 2007/0230627 A1* | 10/2007 | van Veen | H04L 1/0061 |
| | | | 375/340 |
| 2011/0213984 A1* | 9/2011 | Orlando | H04L 9/3239 |
| | | | 713/181 |
| 2014/0350725 A1* | 11/2014 | LaFary | B25J 9/1676 |
| | | | 901/50 |
| 2014/0372758 A1 | 12/2014 | Agiwal et al. | |
| 2016/0314081 A1* | 10/2016 | Matsuo | G06F 21/80 |
| 2019/0378610 A1 | 12/2019 | Barral et al. | |
| 2020/0252162 A1* | 8/2020 | Denboer | H04L 1/08 |
| 2021/0105250 A1* | 4/2021 | Grinius | H04L 61/5061 |
| 2021/0105346 A1* | 4/2021 | Pandey | H04L 1/0061 |
| 2021/0173961 A1* | 6/2021 | Young | H04L 63/12 |

OTHER PUBLICATIONS

Examination Report received in Australian Patent Application No. 2021232001 dated Nov. 9, 2022.

\* cited by examiner

Safety Message Header → 900

| Generic Packet Header | Position | Size | Description |
|---|---|---|---|
| sop | 0 | 1 | Start of packet marker |
| Packet length | 1 | 1 | Length of entire packet, including this header |
| crc16 (Error detecting code) | 2 | 2 | 16-bit CRC |
| source | 4 | 2 | Source address |
| opcode | 6 | 1 | Opcode / packet type |
| sequence | 7 | 1 | Sequence number |
| | Total | 8 | |

Generate, by a first source microcontroller, a first data packet comprising a payload and a first error code, the payload indicating a safety state of a robot
1110

Transmit the data packet from the first source microcontroller to a second source microcontroller
1120

Generate, by the second source microcontroller, a second data packet that includes the payload, the first error code and a second error code
1130

Transmit the second data packet to a sink microcontroller over a wireless communications channel, wherein the sink microcontroller recovers the payload based on at least one of the first error code and the second error code
1140

FIG. 11

SECURE WIRELESS COMMUNICATION OF ROBOTIC SAFETY STATE INFORMATION

CROSS REFERENCE TO RELATED APPLICATIONS

This application claims the benefit of U.S. Provisional Application No. 62/985,241, filed Mar. 4, 2020, the disclosure of which is hereby incorporated by reference herein in its entirety.

TECHNICAL FIELD

The disclosure generally relates to the field of robotics, and more particularly relates to transmitting safety state information to a robot over a communications channel.

BACKGROUND

Conventional systems transmit safety state information using wired communications. For example, if a safety state indicates an emergency state, this information is transmitted to a robot over a wired communication line where a switch flips and power or fuel is cut off to the robot, forcing it to stop. Wireless communication signals are subject to random errors due to, e.g., gaussian noise in wireless communications channels, which in turn results in errors that are not detectable to a safety system. Regulatory standards bodies have established requirements for controlling a probability of undetectable error within a given safety message below a certain level. Existing systems that meet the requirements rely on mechanisms that are redundant and result in needless bandwidth and power consumption. Moreover, existing systems are not scalable, in that as safety messages increase in size, the loss of bandwidth and power consumption in these systems would become prohibitive.

SUMMARY

Systems and methods are disclosed herein for generating, transmitting, and validating safety messages over a communications channel (e.g., wireless) in a manner that is bandwidth and power-efficient and scalable. In an embodiment, a first source microcontroller generates a first data packet comprising a payload and a first error code (e.g., cyclic redundancy check (CRC) code). The payload may indicate a safety state of a robot. The error code may be generated based on a first unique key used by the first source microcontroller to encode the data packet in a consistent manner; however, for efficiency and security, the key may be omitted from the data packet.

The first source microcontroller transmits the data packet from the first source microcontroller to a second source microcontroller. The second source microcontroller generates a second data packet that includes the payload, the first error code and a second error code, where the second error code may be derived based on the payload and a second key unique to the second microcontroller. The second source microcontroller may verify that its safety state matches the safety state of the first source microcontroller prior to generating the second data packet. The second data packet, when successfully generated, is a safety message.

The second source microcontroller transmits the second data packet to a sink microcontroller over a communications channel (e.g., wireless), wherein the sink microcontroller recovers the payload based on at least one of the first error code and the second error code. To recover the payload, the sink microcontroller may be pre-programmed with one or both of the first key and the second key, and may decode the encoded payload using the pre-programmed key(s).

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 9 illustrates one embodiment of information within a safety message header.

FIG. 11 illustrates one embodiment of an exemplary process for generating and verifying a safety message.

DETAILED DESCRIPTION

Figure 1:
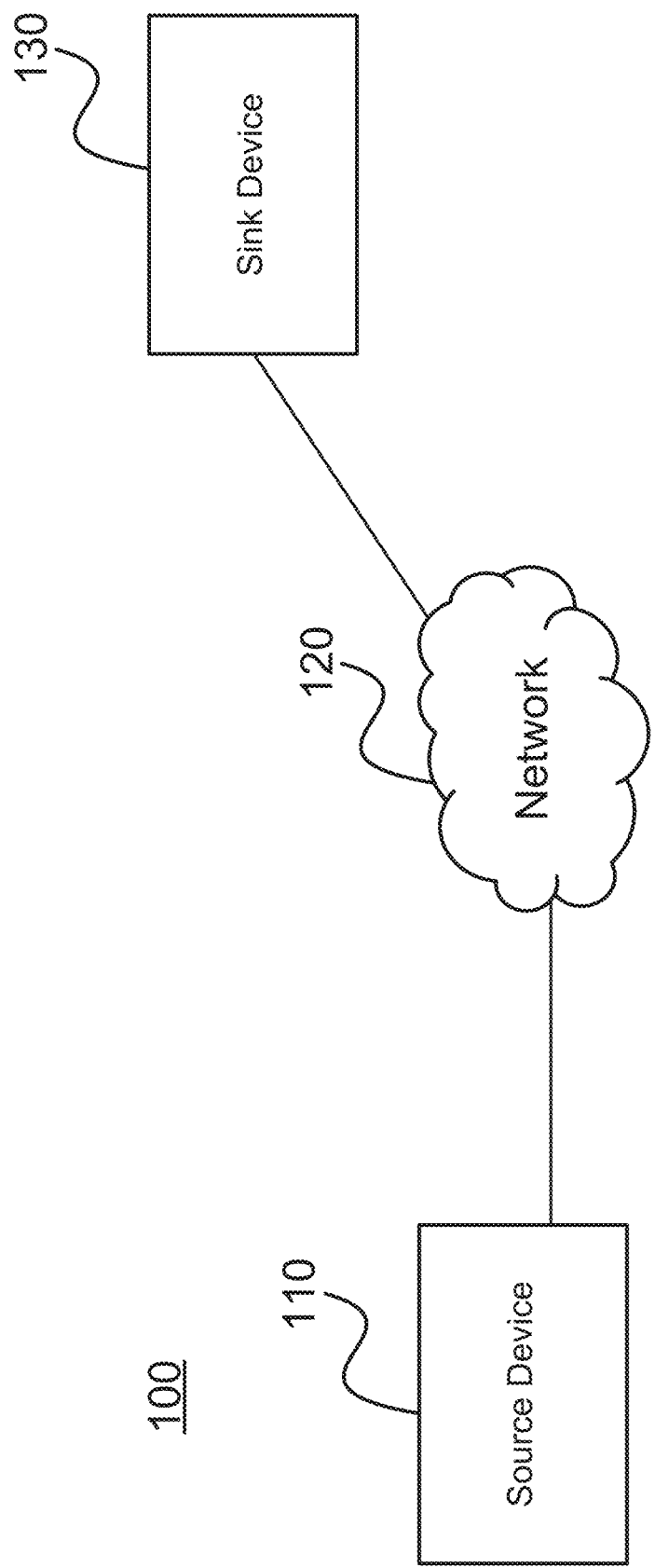
FIG. 1 illustrates one embodiment of a system environment for communicating between a source device and a sink device.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment for Source and Sink Devices

Environment 100 includes source device 110, network 120, and sink device 130. Source device 110 may be any device that provides safety state information to sink device 130. The term safety state information, as used herein, may refer to information relating to whether sink device 130 should modify its operation due to a safety condition. For example, safety state information may include whether an emergency stop (sometimes referred to herein as e-stop or Estop) button has been activated, in which case a power or fuel source of sink device should be de-activated. Safety state information may include any other information, such as environment information (e.g., camera information) from which nearby obstacles and hazards may be derived which, in turn, may cause sink device 130 to modify its operation to avoid engaging with the obstacles and hazards. Source device 110, while depicted as a single device, may include two or more devices. Source device 110 may include one or more sensors from which safety state information is derived, and may include one or more controllers which may alter a safety state (e.g., a controller that controls one or more aspects of sink device 130). As described in further detail below, source device 110 may include a plurality of safety microcontrollers that process signals into safety messages including safety state information.

Network 120 may be any data communications channel between source device 110 and sink device 130. The communications channel may be a direct connection, or may include interstitial relay devices (e.g., electronic relays, routers, gateways, and so on). The communications channel may include two or more virtual channels. For example, where a plurality of safety microcontrollers are installed on source device 110, each safety microcontroller may have a corresponding virtual channel within the communications channel through which its communications are transmitted. Optionally, the destination address of packets transmitted through such a virtual channel may be dedicated to arriving at a particular microcontroller of sink device 130.

Sink device 130 may be any device that is programmed to modify its state of operation based on safety information. Commonly, sink device 130 is a robot where, when the robot performs operations, those operations involve some form of hazard (e.g., to human safety, to breaking an object, to the robot itself potentially being damaged by an obstacle, to the robot causing a load it is manipulating to be damaged, and so on). However, sink device 130 is not limited to being a robot, and may be any other device. Exemplary devices may include anything where control of a dangerous action is needed to reduce risk to humans or other loss, such as milling machines, conveyor belts, cranes, excavators, tractors, harvesters, forestry equipment, a nuclear power plant (or sub-component thereof), an oil refinery (or sub-component thereof), and so on. As used herein, the term "robot" may refer to any device having physical machinery that is controlled by a device controller.

In an embodiment where network 120 is a wireless communications channel, in order to ensure that the probability of undetectable error in a message between source device 110 and sink device 130 is below a threshold maximum error value, source device 110 may have two safety microprocessors that each send one copy of a data payload describing safety information. The copies may differ in that they may be inverted from one another. For example, each safety microprocessor may periodically (e.g., every 20 milliseconds) transmit a message that describes the state of an e-stop button. The two messages may each be scrambled (e.g., using a salt or scrambling code unique to the safety microprocessor that is scrambling the copy). The two messages may be transmitted over the wireless communications channel (e.g., separately or together). Sink device 130 receives the messages, descrambles them, and determines whether the two messages are highly correlated (e.g., 100% correlated, or within a threshold of 100% correlated such as 99.9% where the threshold is 0.1%). Where the messages are highly correlated, sink device 130 determines that the safety state information is correct. Where the messages are not highly correlated, sink device 130 determines that safety state information is not correct, and responsively modifies the operation of sink device 130 (e.g., putting a robot into a safe state). In an embodiment, sink device 130 may implement a time threshold to allow for the source microcontrollers to have safety messages that are out of sync, that become in sync (e.g., 2 message cycles, such as 40-50 ms if the expected message rate is 20 ms per message). Responsive to detecting that safety messages are out of sync for a time exceeding the time threshold, sink device 130 may determine that the safety state information is not correct, and may determine a fault and enter the safe state.

Advantageously, by transmitting two messages across the wireless communications channel in this embodiment, it is ensured that undetectable error does not exist or is sufficiently small, given that undetectable error would cause a poor correlation between the two messages. However, transmitting two messages is bandwidth-inefficient and these inefficiencies prevent scalability to complex systems. For example, e-stop information is binary and thus requires small bandwidth such that transmitting two messages is technically practical. However, where analog values that could be many bytes long are transmitted, or something more complex such as a point field with kilobytes of data are to be transmitted frequently, transmitting two copies of this information would require an impractical amount of bandwidth consumption. To address these issues, further embodiments are described below with respect to FIGS. 2-11 that do not require a transmission of multiple copies of a safety message from a source device to a sink device.

Exemplary Source and Sink Microcontroller Architecture

Figure 2:
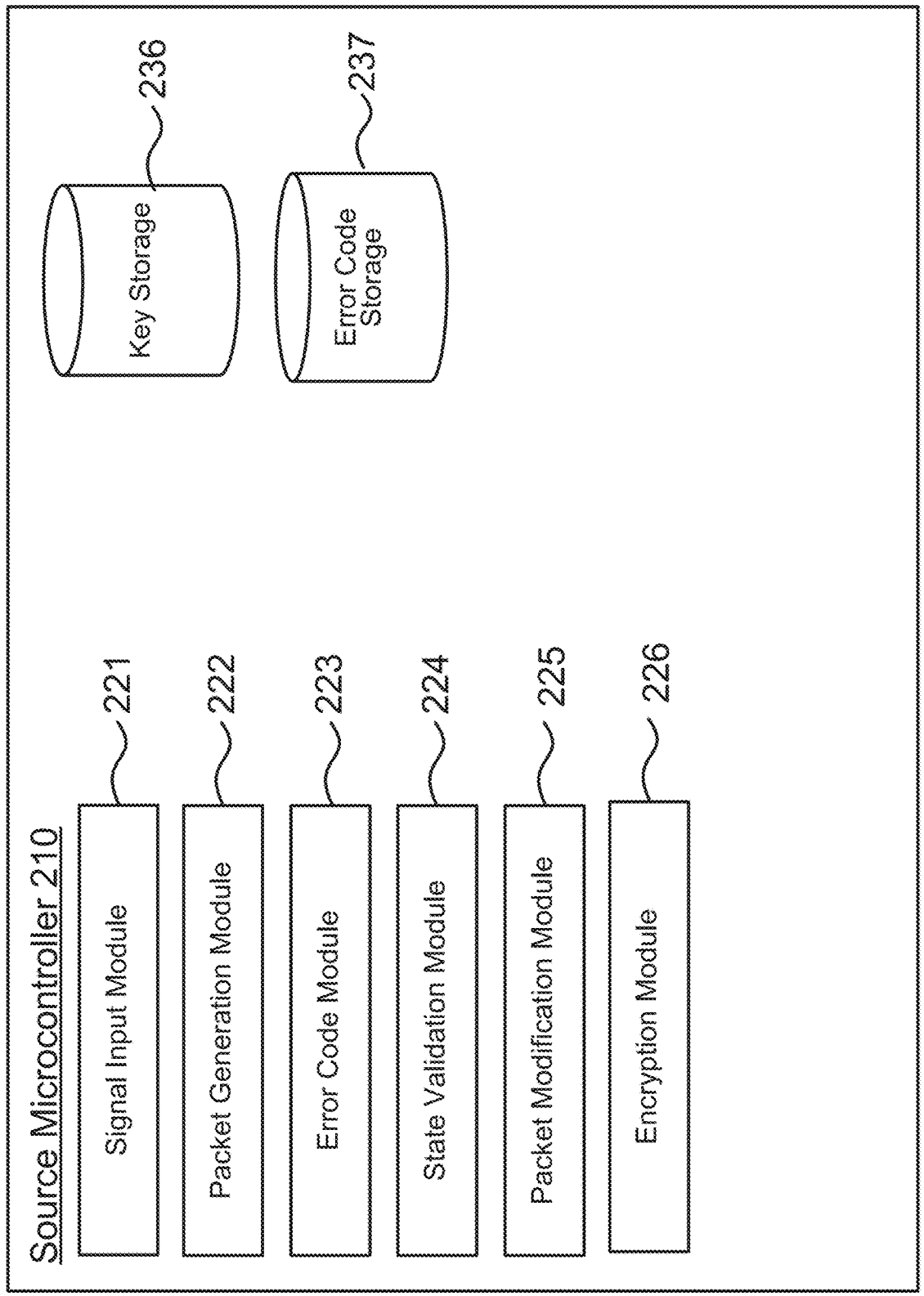
FIG. 2 illustrates one embodiment of exemplary modules and databases used by a source microcontroller.

FIG. 2 illustrates one embodiment of exemplary modules and databases used by a source microcontroller. As depicted in FIG. 2, source microcontroller 210 includes signal input module 221, packet generation module 222, error code module 223, state validation module 224, packet modification module 225, encryption module 226, key storage 236, and error code storage 237. The modules and databases shown in FIG. 2 are merely exemplary; more or fewer databases and modules may be used to achieve the functionality described herein. Moreover, while the modules and databases are described as part of source microcontroller 210, these modules and/or databases may be instantiated elsewhere in a source device 110 that houses source microcontroller 210. Multiple source microcontrollers 210 may be implemented in a single source device 110. The term microcontroller is not meant to be limiting; while the exemplary use case is microcontrollers, wherever the term microcontroller is used herein, the any controller or processor may be used in its place.

Signal input module 221 receives signals based on sensor data received or generated by the source device 110 in which source microcontroller 210 is housed. For example, if a user presses an e-stop button that is operably coupled to source device 110, then signal input module 221 detects a signal indicating that the e-stop button is pressed. The signals may be binary, as is the case with the e-stop example. The signals may be analog (e.g., where signals are received based on inputs from one or more joysticks of a remote controller of sink device 130 where source device 110 acts as the remote controller), and may include multi-dimensional point clouds (e.g., based on LIDAR input and/or other camera or spectroscopy data).

Packet generation module 222 generates data packets including a header, a safety payload (also referred to simply as a payload herein interchangeably), and one or more error codes. Different safety microcontrollers may generate packets in different manners. The particulars of how packet generation module 222 generates data packets is described with reference to FIG. 4 and FIG. 5 below. Particulars about packet headers and payload contents are described with respect to FIGS. 6-9 below.

Error code module 223 generates an error code (interchangeably used herein with "error detecting code"). In an embodiment, the error code is a CRC value. Error code module 223 generates the CRC value based on the payload. The CRC value may additionally be based on a length of a key unique to the source microcontroller 210 that is appended to the payload. Rather than use CRC values, any other type of check sequence may be used, including a checksum algorithm (e.g. simple sums, fletchers sums, XOR algorithms, and so on), hashing functions, cryptographic hashes (e.g., MD5, HMAC, SHA, etc.), and so on. Further details about how the error code is derived, depending on which source microcontroller is being used, is described with respect to FIG. 4 and FIG. 5 below.

In an embodiment, two different source microcontrollers 210 manipulate a data packet before it is transmitted from a source device 110 to a sink device 130. First, an initial source microcontroller 210 generates a packet having a payload and an error code, and then, a second source microcontroller 210 receives the packet and adds its own error code to the packet. This process is described in further detail with respect to FIG. 4 and FIG. 5 below. State validation module 224 is used by the second source microcontroller 210 in this embodiment to validate state prior to appending its own error code to the packet.

When the second source microcontroller 210 receives a packet from the first source microcontroller 210, the state validation module 224 inspects safety state information in the payload to determine the safety state that the first source microcontroller 210 is in. Second source microcontroller 210 compares that safety state information to its own safety state information to determine whether there is a match. Where there is no match, second state validation module 224 determines that the second source microcontroller 210 is not in sync with the first source microcontroller 210. In an embodiment, responsive to determining that the second source microcontroller 210 is not in sync with the first source microcontroller 210, the second source microcontroller 210, source microcontroller 210 transmits a message that causes sink device 130 to enter a fault state. In another embodiment, responsive to determining that the second source controller 210 is not in sync with the first source microcontroller 210, second source microcontroller 210 waits to generate a packet for transmission to sink device 130 until the two source microcontrollers are in sync for an interval of time. As an illustrative example, when an e-stop button is pressed, both the first and second source microcontrollers receive signals that update their safety state information to indicate that the e-stop button is in fact pressed. However, there may be a length of time (e.g., milliseconds) where latency causes the two states to be out of sync because only one of the two microcontrollers have received the signals and updated their safety state information accordingly. To ensure accurate safety state information is passed downstream to sink device 130, state validation module 224 ensures that the two source microcontrollers are in sync prior to transmitting a safety message to sink device 130. In an embodiment, some disagreement between safety states of the two microcontrollers is allowed (e.g., below a predefined difference threshold or window) to account for differences in timing and noise, whereby a match will be determined notwithstanding a qualified disagreement. Where, after the interval of time, the source microcontrollers are determined to remain out of sync, source microcontroller 210 transmits a message that causes sink device 130 to enter a fault state.

Packet modification module 225 is executed by the second source microcontroller. Packet modification module 225 enables the second source microcontroller to generate a safety message by modifying the data packet received from the first source microcontroller. Further details about packet modification module 225 are described in detail below with respect to FIG. 5.

Encryption module 226 optionally encrypts the safety message before it is transmitted. Encryption provides a higher level of security than the simple scrambling that is normally performed using the unique key of each source microcontroller. In an embodiment, encryption module 226 encrypts the payload of the packet prior to appending the error code to the payload. In such an embodiment, error code module 223 appends the error code to the encrypted payload, rather than to a scrambled or naked payload.

Key storage 236 stores one or more keys that are unique to source microcontroller 210. The keys are used by packet generation module 222 to scramble the payload prior to transmitting the payload. Error code storage 237 stores error codes for later use. For example, a second microcontroller may strip an error code from a packet the second microcontroller is going to modify, and may store the stripped error code to error code storage 237. After performing some modifications, the second microcontroller may retrieve the stripped error code from error code storage 237 and re-append it to the modified data packet.

Source microcontroller 210 may directly transmit the data packet to sink device 130, or may transmit the data packet to another processor of source device 110, which in turn transmits the data packet to sink device 130.

Figure 3:
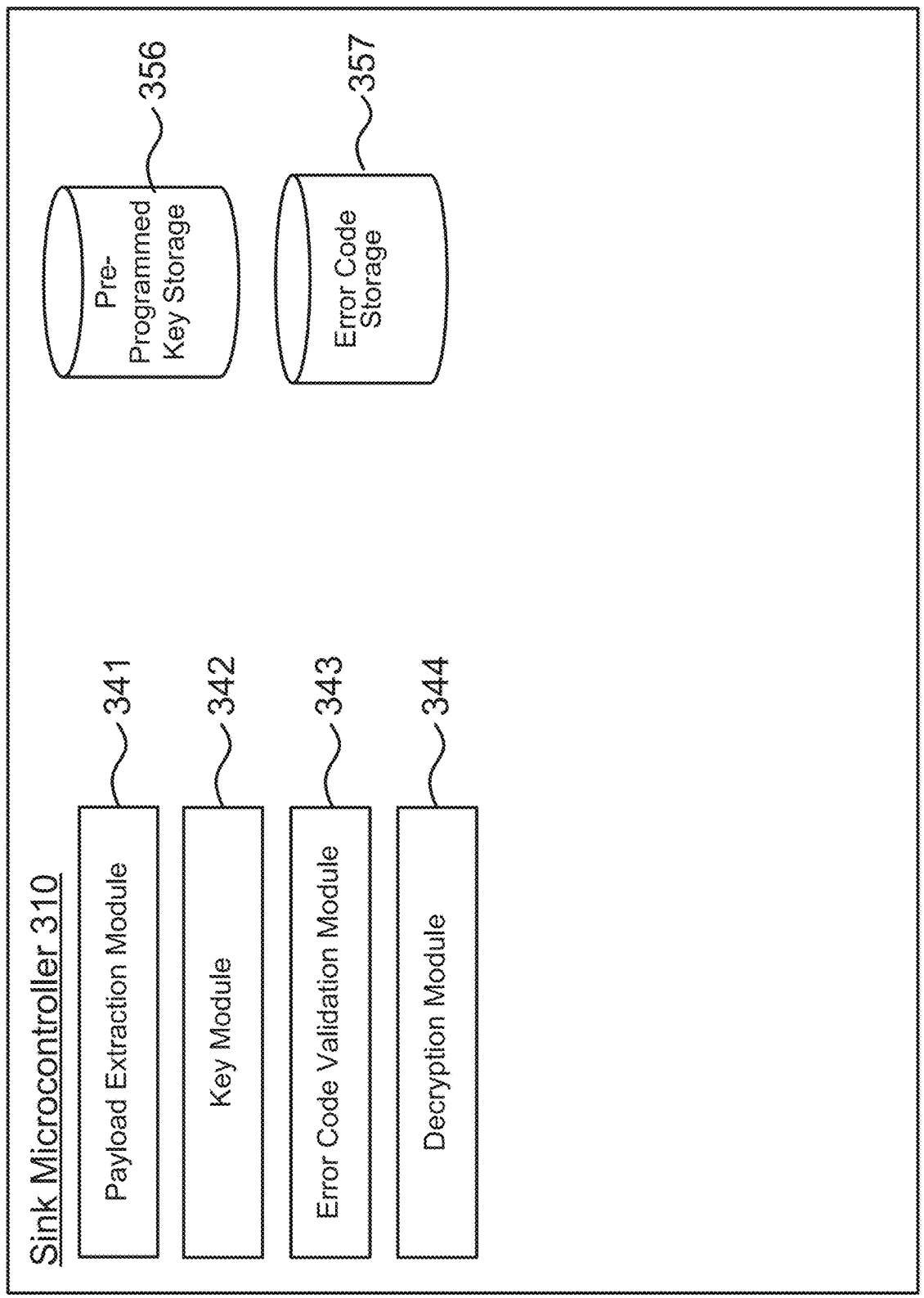
FIG. 3 illustrates one embodiment of exemplary modules and databases used by a sink microcontroller.

FIG. 3 illustrates one embodiment of exemplary modules and databases used by a sink microcontroller. As depicted in FIG. 3, sink microcontroller 310 includes payload extraction module 341, key module 342, error code validation module 343, decoder module 344, pre-programmed key storage 356, and error code storage 357. The modules and databases shown in FIG. 3 are merely exemplary; more or fewer databases and modules may be used to achieve the functionality described herein. Moreover, while the modules and databases are described as part of sink microcontroller 310, these modules and/or databases may be instantiated elsewhere in a sink device 130 that houses sink microcontroller 310. Multiple sink microcontrollers 310 may be implemented in a single sink device 310. The term microcontroller is not meant to be limiting; while the exemplary use case is microcontrollers, wherever the term microcontroller is used herein, the any controller or processor may be used in its place.

Payload extraction module 341 extracts the payload from the received packet. The payload is either scrambled, encrypted, or both. Payload extraction 341 may extract the payload by removing the appended error code from the payload and storing it in error code storage 357. Key module 342 retrieves one or more pre-programmed key(s) corresponding to one or more of the first source microcontroller, the second source microcontroller, or both, from pre-programmed key storage 356. Key module 342 applies the retrieved key to decode the scrambled payload. Error code validation module 343 generates an error code for the descrambled payload, and compares it to the appended error code that was stored in error code storage 357. Error code validation module 343 determines that the safety message is valid responsive to determining that the generated error code matches the appended error code. Error code validation module 343 determines that the safety message is invalid responsive to determining that the generated error code does not match the appended error code. Because the keys are unique to the source microcontroller, the error codes are unique to the source microcontroller, thus essentially acting as a signature of the source microcontroller that is able to be validated in this manner.

Responsive to determining that the safety message is invalid, in an embodiment, sink microcontroller 310 may command sink device 130 to enter a safety mode. Responsive to determining that the safety message is valid, sink microcontroller 310 may determine from the safety message whether a modification of a mode of operation of sink device 130 corresponds to the safety message, and may change the mode of operation of sink device 130 accordingly.

Exemplary Data Flow for Generating Safety Message

Figure 4:
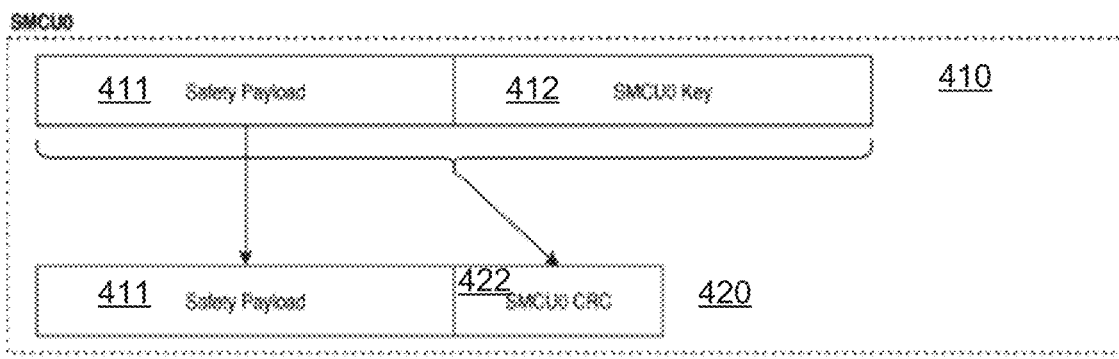
FIG. 4 illustrates one embodiment of a data flow for generating a safety packet from a first source microcontroller.

FIG. 4 illustrates one embodiment of a data flow for generating a safety packet from a first source microcontroller. FIG. 4 depicts activity of source microcontroller 400, also referred to herein as SMCU0 (source microcontroller unit 0). Source microcontroller 400 generates data packets (also referred to as safety messages) responsive to detecting a trigger. Exemplary triggers include detecting sensor information (e.g., that an e-stop button was pressed) and a periodic (or a-periodic) time interval having lapsed where safety messages are sent periodically. When the trigger is detected, source microcontroller 400 packages safety information into safety payload 411 (e.g., using packet generation module 222).

Source microcontroller 400 appends key 412 to safety payload 411. Source microcontroller 400 then generates an error code based on the structure of packet 410, having both safety payload 411 and key 412 (e.g., using error code module 223). After generating the error code, source microcontroller 400 removes key 412 from the packet, and appends error code 422 to safety payload 411, thus resulting in data packet 420. Source microcontroller then sends data packet 420 to source microcontroller 500 for further modification, as discussed with reference to FIG. 5.

Figure 5:
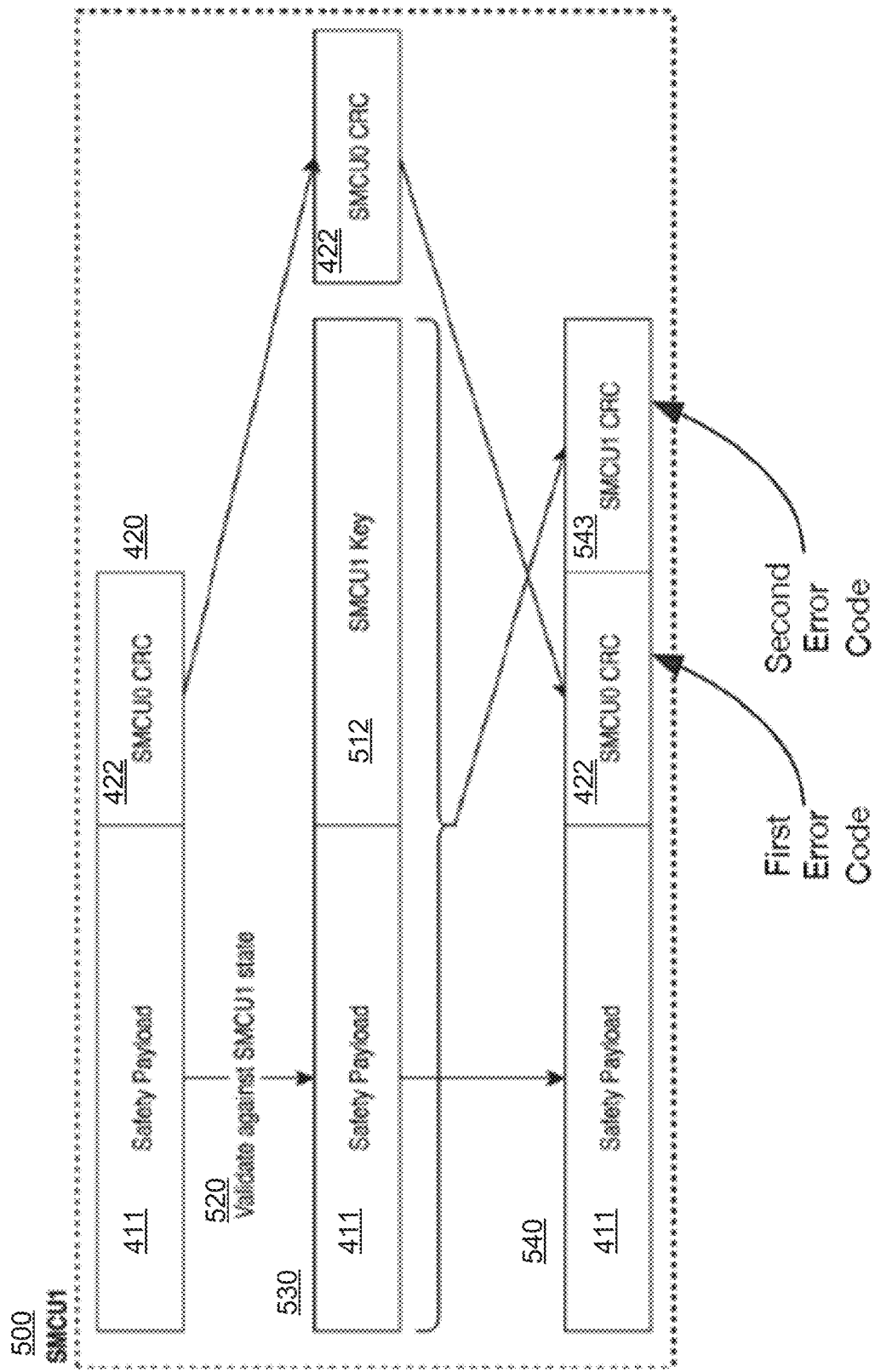
FIG. 5 illustrates one embodiment of a data flow for generating a safety packet from a second source microcontroller based on a packet received from a first source microcontroller.

FIG. 5 illustrates one embodiment of a data flow for generating a safety packet from a second source microcontroller based on a packet received from a first source microcontroller. Source microcontroller 500 (also referred to herein as SMCU1) receives data packet 420 from source microcontroller 400. Responsive to receiving data packet 420, source microcontroller 500 determines the safety state indicated in safety payload 411 and validates 520 that state against its own safety state (e.g., using state validation module 224). Source microcontroller 500 modifies data packet 420 into data packet 530 by removing error code 422 from safety payload 411, and appending its own key 512. This enables source microcontroller 500 to generate an error code 543 that is unaffected by the error code from the source microcontroller 400. Source microcontroller 500 then generates data packet 540 by removing key 512 from data packet 530, re-appending error code 422 to safety payload 411, and appending error code 543 to the data packet. As depicted, error code 422 is appended first, and error code 543 is appended second. This is non-limiting, and error codes may be appended in any error. Appending error codes in a pre-determined order may be advantageous in that a receiving processor will be able to reliably know which error code to compare to when decoding the safety message, thus preventing a waste of processing power in comparing to an inapplicable error code before comparing to the correct error code.

FIGS. 4 and 5 use the term "CRC" where error codes are depicted. This is merely exemplary and to aid understanding; any error code may be used in place of a CRC value wherever depicted. The use of two source microcontrollers is merely illustrative; the process of FIG. 5 may be repeated for any number of source microcontroller, where a next source microcontroller removes error code values from prior microcontrollers to compute an error code value using its own key, and then re-appends the error code values from the prior microcontrollers.

The data flow shown in FIGS. 4-5 enables a system to keep undetectable error below a threshold (e.g., a regulatory threshold) without having to transmit two messages from source device 110 to sink device 110. Specifically, using at least two messages (one from each source microcontroller), each with their own error detection mechanism (e.g., CRC) provides both redundancy (the data is sent twice within source device 110) and diversity (data comes from at least two independent sources, the sources being the source microcontrollers). Good error detection on each safety message internal to source device 110 combined with redundancy significantly decreases the likelihood of a undetectable error in the messages, as the random noise that causes these errors is very unlikely to repeat in the same pattern in both messages. A penalty of doubling needed bandwidth in transmitting two messages across network 120 to sink device 130 is avoided by using a unique signature for each source microcontroller, which makes the resulting error check code for each processor unique, thus have two unique checks possible on the same data (plus each processors unique signature).

Figure 6:
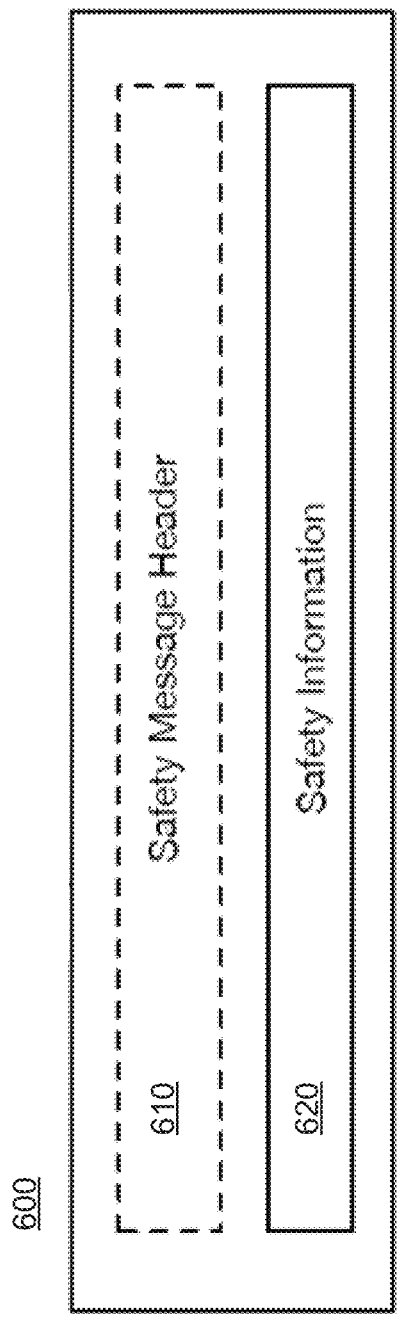
FIG. 6 illustrates one embodiment of a representation of a safety packet.

FIG. 6 illustrates one embodiment of a representation of a safety packet. The term safety packet as used herein may refer to any packet including safety information (e.g., the packets generated using the modules and data flows of FIGS. 2-5). In some variations, the safety message (e.g., 600) identifies safety critical status (safety state) of one or more input devices coupled to a given source microcontroller of source device 110. In some variations, the source microcontroller generates the safety message 600. The safety message may include a safety message header 610, and safety information 620. The contents of safety message header 610 and safety information 620 are described in further detail in FIGS. 7-9. The term safety message may refer to any payload of a safety packet having safety information.

Figure 7:
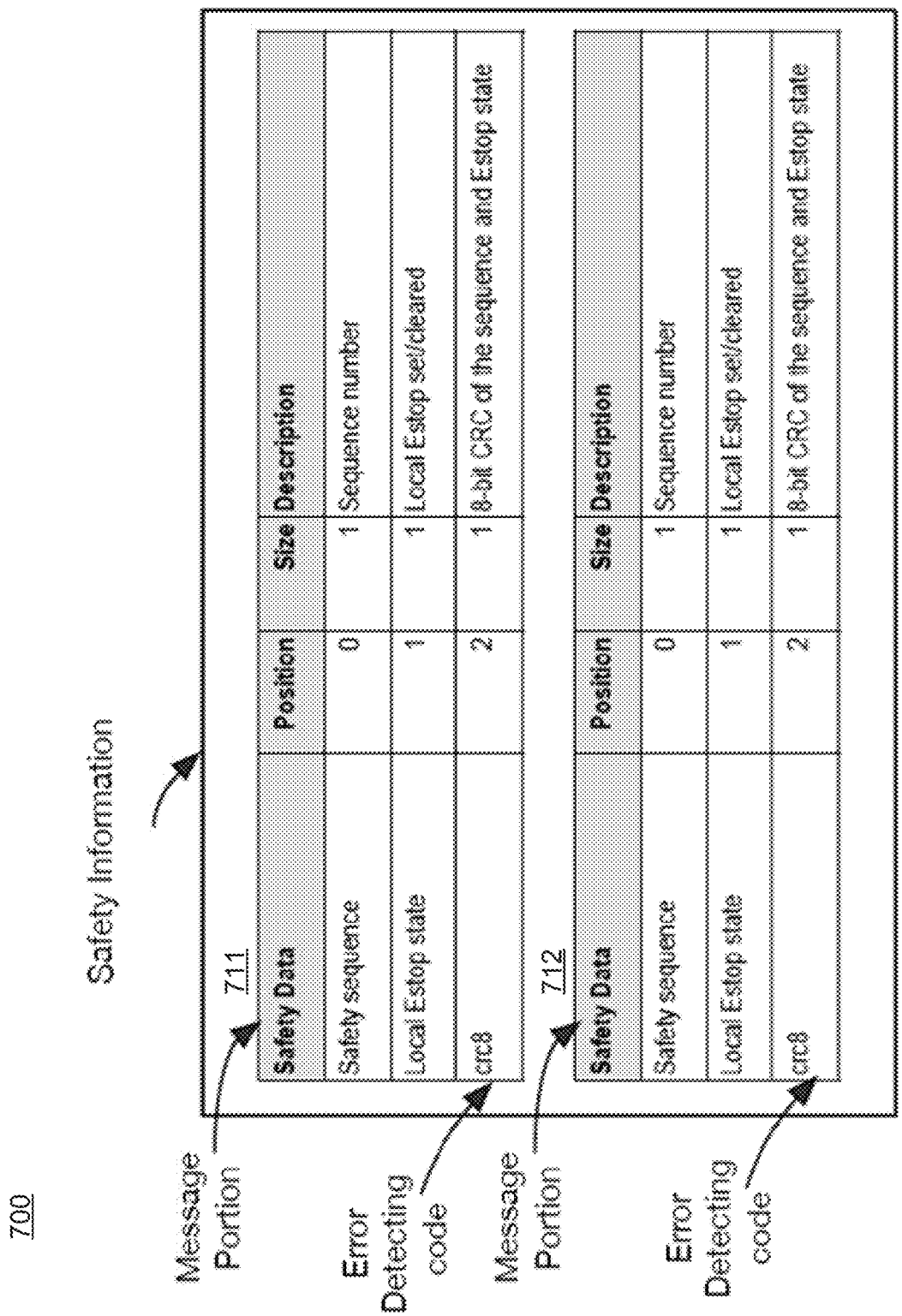
FIG. 7 illustrates one embodiment of a payload of a safety packet.
Figure 8:
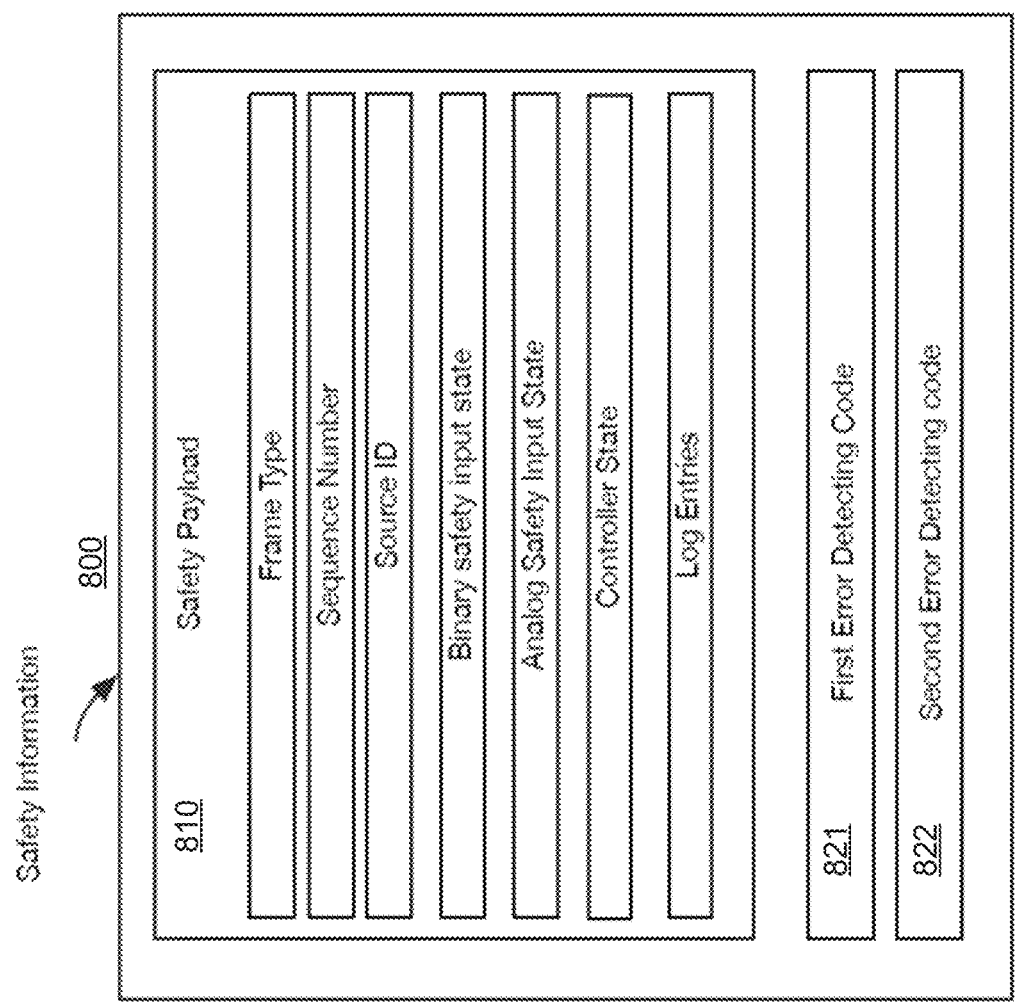
FIG. 8 illustrates a second embodiment of a payload of a safety packet.

FIG. 7 illustrates one embodiment of a payload of a safety packet, and FIG. 8 illustrates a second embodiment of a payload of a safety packet. Specifically, FIG. 7 shows safety information within a safety packet, which may be within a payload of a safety message. In a first variation, each safety processor (e.g., 400, 500) generates a respective portion (e.g., message portions 711 and 712 shown in FIG. 7) of the safety message 600. In the first variation of generating the safety message, each safety processor passes its portion (e.g., 711, 712 shown in FIG. 5B) of the safety message (e.g., data identifying safety state generated by the safety processor at S210) independently to a processor of source device 110, which combines the portions into a single message that is sent to the sink device 130.

In some implementations, for each message portion (e.g., 711, 712) of the safety message generated by a respective safety processor (e.g., a source microcontroller), a new sequence number (e.g., safety sequence) is generated for the message portion, the safety processor's generated (or updated) safety state (e.g., e-stop state) (for at least one safety input device) is added to the message portion, and an error detecting code is generated. The error detecting code can be a CRC (cyclic redundancy check). In an example, the error detecting code is a CRC of the sequence number and the safety state. In an example, the CRC is an 8-bit CRC. However, any suitable type of error detecting code can be used. In an example, the message portion includes at least one of the sequence number, the safety state, and the error detecting code. In an example, the message portion includes a safety payload and the error detecting code, and the safety payload includes the sequence number (safety sequence) and the safety state (e.g., Local Estop State, Input State, etc.). In an example, the message portion is scrambled (e.g., encrypted) by using a security key associated with the related safety input device (e.g., 131), and the security key is known to the safety processor (e.g., 111) and a safety processor (e.g., 121) included in a device (e.g., 120) that uses the safety message (e.g., 500). In some implementations, each message portion (e.g., 511, 512) is 2-bytes. In some implementations, each message portion is 3-bytes. However, each message portion can be any suitable size.

In a second variation, shown in FIG. 8, there may be a single safety payload (e.g., 810 shown in FIG. 8) of a safety message 800 generated by a safety microcontroller, and one or more safety microcontrollers validate the generated safety payload (e.g., by generating respective error detecting codes). The validated safety payload (e.g., 810 shown in FIG. 8) can be sent for output to sink device 130. In some implementations, safety processors pass safety information (e.g., 800 shown in FIG. 5C) serially until a single safety information is passed to the a processor of source device 110. In some implementations, this single safety information (e.g., 800) includes one copy of the safety payload (e.g., 810). The safety payload identifies the safety state generated at S220. In addition to the safety payload, the single safety information (e.g., 810) includes error detecting data (e.g., 821, 822) generated by each safety microcontroller using a unique key code. In some implementations, the safety payload (e.g., 810) includes a variety of information related to one or more safety critical inputs. In some implementations, the safety payload identifies at least one of: frame type (that specifies a format and length of the safety message); sequence number (e.g., a monotonically increasing number that identifies an order of the safety message); and a source identifier (e.g., a unique identifier for the related safety input device). In some implementations, the sequence number can be used to detect repeated, out of order, and delayed messages. In some implementation, the safety payload identifies at least one of: a binary safety input state (e.g., emergency stop button, Enable/Three-state switch, Safety enabled push button, etc.); an analog safety state (e.g., safety enabled joystick value, safety sensor value, etc.); controller state (e.g., active faults, critical events, etc.); and log entries (e.g., highly secure and/or safety critical event log info). However, the safety payload can identify any suitable type of information.

FIG. 9 illustrates one embodiment of information within a safety message header. In an example, the safety message 600 includes a safety message header (e.g., 900). In an example, the header 900 includes the error detecting code for the safety message 600. In an example, the header (e.g., 900) includes at least one of: a start of packet marker; a length of the safety message; the error detecting code for the safety message; a source address (e.g., identifying a safety input device); an opcode; and a sequence number for the safety message 600. However, the header can include any suitable information. In an example, each safety message (e.g., 500) is 14-bytes. However, each safety message can be any suitable size.

Computing Machine Architecture

Figure 10:
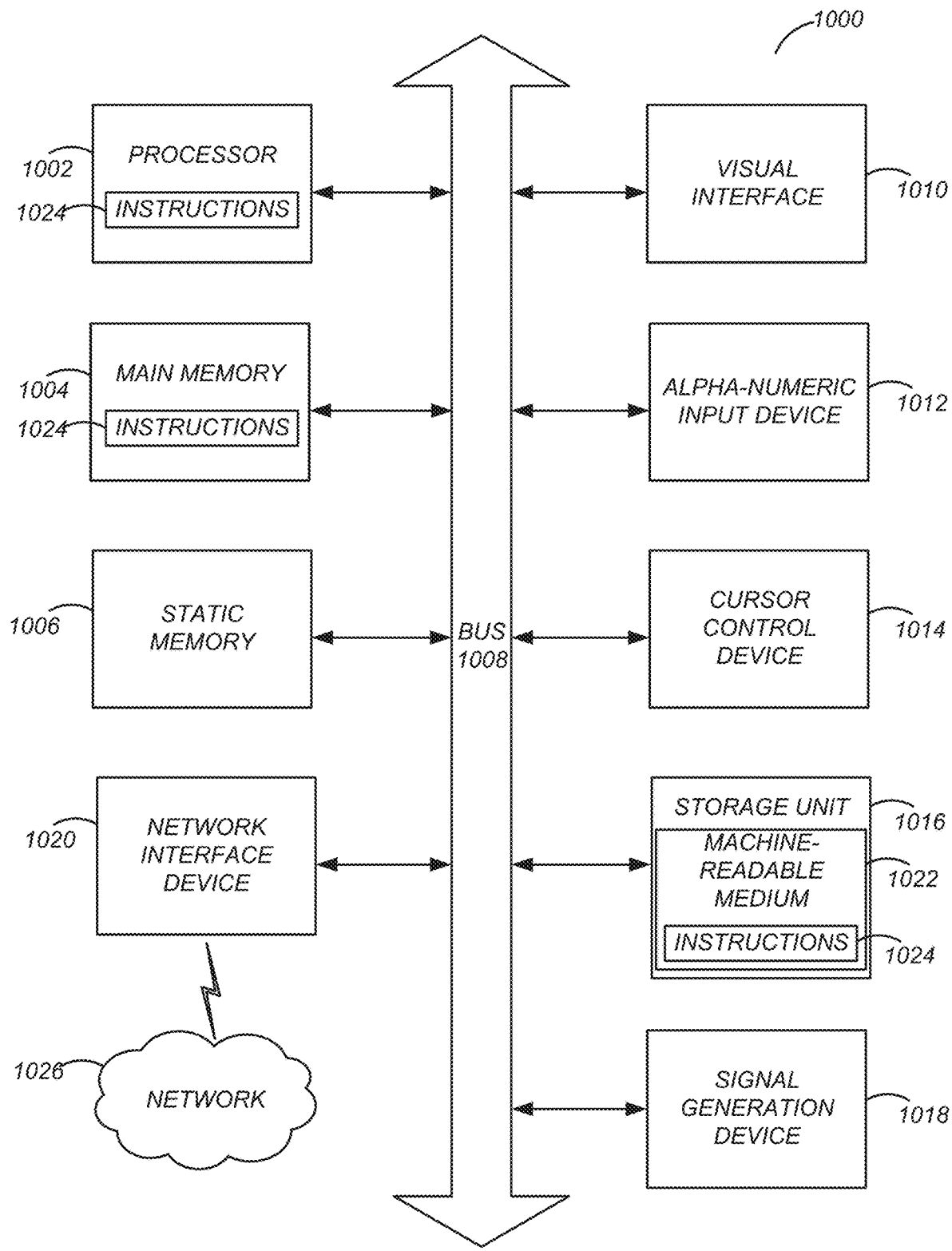
FIG. 10 is a block diagram illustrating components of an example machine able to read instructions from a machine-readable medium and execute them in a processor (or controller).

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, controller for robotics and other machinery (whether fixed or mobile), or any machine capable of executing instructions 1024 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen. The computer system 1000 may also include alpha-numeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Exemplary Safety Message Process

FIG. 11 illustrates one embodiment of an exemplary process for generating and verifying a safety message. The elements of process 100 may be performed by a processor (e.g., processor 1002 executing one or more modules of one or more source microcontrollers 210 of source device 110). Process 1100 begins with a first source microcontroller (e.g., source microcontroller 400) generating 1110 (e.g., using packet generation module 222) a first data packet (e.g., data packet 420) comprising a payload (e.g., safety payload 411) and a first error code (e.g., error code 422), the payload indicating a safety state of a robot (e.g., as shown in safety information 711 and/or safety information 800). The first source microcontroller transmits 1120 the data packet from the first source microcontroller to a second source microcontroller (e.g., source microcontroller 500).

The second source microcontroller generates 1130 a second data packet (e.g., data packet 540) that includes the payload, the first error code and a second error code (e.g., error code 543). The second source microcontroller transmits the second data packet to a sink microcontroller (e.g., sink microcontroller 310 of sink device 130) over a communications channel (e.g., network 120, which may be wireless), wherein the sink microcontroller recovers the payload based on at least one of the first error code and the second error code.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for efficiently transmitting safety information from source to sink devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   at a source device comprising a first microcontroller and a second microcontroller:
      generating, by the first microcontroller, a first error detecting code value based on a payload, indicating a first safety state of an input device, and a first key associated with the first microcontroller;
      generating, by the first microcontroller, a first data packet comprising the payload and the first error detecting code value;
      transmitting the first data packet from the first microcontroller to the second microcontroller;
      generating, by the second microcontroller, a second error detecting code value based on the payload and a second key associated with the second microcontroller;

generating, by the second microcontroller, a second
data packet comprising the payload, the first error
detecting code value, and the second error detecting
code value; and
transmitting the second data packet to a sink device
over a communication channel; and
at the sink device comprising a third microcontroller,
pre-programmed with the first key associated with the
first microcontroller, and a fourth microcontroller pre-
programmed with the second key associated with the
second microcontroller:
validating the second data packet based on the first
error detecting code value and the second error
detecting code value by:
extracting the payload from the second data packet;
appending, by the third microcontroller, the first key
to the payload;
generating, by the third microcontroller, a third error
detecting code value based on the payload and the
first key associated with the first microcontroller;
appending, by the fourth microcontroller, the second
key to the payload;
generating, by the fourth microcontroller, a fourth
error detecting code value based on the payload
and the second key; and
validating the second data packet in response to:
verifying a match between the third error detecting
code value and the first error detecting code
value; and
verifying a match between the fourth error detect-
ing code value and the second error detecting
code value; and
in response to validating the second data packet, con-
trolling a mode of operation of the sink device based
on the payload.

2. The method of claim 1:
wherein generating the first error detecting code value
based on the payload comprises:
appending the first key to the payload; and
in response to appending the first key to the payload,
generating the first error detecting code value based
on the payload and the first key; and
wherein generating the first data packet comprises, in
response to generating the first error detecting value
based on the payload and the first key, generating the
first data packet:
comprising the payload and the first error detecting
code value; and
excluding the first key.

3. The method of claim 2:
wherein generating the second error detecting code value
based on the payload comprises:
removing the first error detecting code value from the
first data packet;
appending a second key, associated with the second
microcontroller, to the payload; and
generating the second error detecting code value based
on the payload and the second key; and
wherein generating the second data packet comprises, in
response to generating the second error detecting code
value based on the payload and the second key, gen-
erating the second data packet:
comprising the payload, the first error detecting code
value, and the second error detecting code value; and
excluding the second key.

4. The method of claim 3, wherein validating the second
data packet based on the first error detecting code value and
the second error detecting code value comprises, at the sink
device comprising the third microcontroller further pre-
programmed with the second key associated with the second
microcontroller:
appending the first key to the payload;
in response to appending the first key to the payload,
generating the third error detecting code value based on
the payload and the first key;
appending the second key to the payload;
generating a fourth error detecting code value based on
the payload and the second key; and
validating the second data packet in response to verifying
a match between the fourth error detecting code value
and the second error detecting code value.

5. The method of claim 1:
further comprising encrypting, by the second microcon-
troller, the payload based on a second key, associated
with the second microcontroller, to generate an
encrypted payload;
wherein generating the second error detecting code value
based on the payload comprises generating the second
error detecting code value based on the encrypted
payload;
wherein generating the second data packet comprises
generating the second data packet comprising the
encrypted payload, the first error detecting code value,
and the second error detecting code value; and
wherein controlling the mode of operation of the sink
device based on the payload comprises:
decrypting the encrypted payload based on the second
key, associated with the second microcontroller and
pre-programmed into the sink device, to generate a
decrypted payload; and
controlling the mode of operation of the sink device
based on the decrypted payload.

6. The method of claim 1:
wherein generating the first error detecting code value
comprises generating a first cyclic redundancy check
value based on the payload;
wherein generating the first data packet comprises gen-
erating the first data packet comprising the payload and
the first cyclic redundancy check value;
wherein generating the second error detecting code value
comprises generating a second cyclic redundancy
check value based on the payload;
wherein generating the second data packet comprises
generating the second data packet comprising the pay-
load, the first cyclic redundancy check value, and the
second cyclic redundancy check value; and
wherein validating the second data packet comprises
validating the second data packet based on the first
cyclic redundancy check value and the second cyclic
redundancy check value.

7. The method of claim 1:
further comprising, by the first microcontroller:
accessing first safety state information representing the
first safety state of the input device; and
generating the payload comprising the first safety state
information; and
further comprising, by the second microcontroller:
in response to receiving the first data packet, accessing
the first safety state information in the payload;
accessing second safety state information representing
a second safety state of the input device; and in response to detecting a match between the first safety state information and the second safety state information, validating the first safety state of the input device.

8. The method of claim 7, wherein transmitting the second data packet to the sink device comprises transmitting the second data packet to the sink device in response to validating the first safety state of the input device.

9. The method of claim 1:
further comprising, by the first microcontroller:
accessing first safety state information representing the first safety state of the input device; and
generating the payload comprising the first safety state information;
further comprising, by the second microcontroller:
in response to receiving the first data packet, accessing the first safety state information in the payload;
accessing second safety state information representing a second safety state of the input device at a first time;
in response to detecting a difference between the first safety state information and the second safety state information, accessing third safety state information representing a third safety state of the input device at a second time succeeding the first time, a duration spanning the first time to the second time falling below a threshold duration; and
in response to detecting a match between the first safety state information and the third safety state information, validating the first safety state of the input device; and
wherein transmitting the second data packet to the sink device comprises transmitting the second data packet to the sink device in response to validating the first safety state of the input device.

10. The method of claim 9, further comprising:
by the first microcontroller:
accessing fourth safety state information representing a fourth safety state of the input device;
generating a second payload comprising the fourth safety state information;
generating a fifth error detecting code value based on the second payload;
generating a third data packet comprising the second payload and the fifth error detecting code value; and
transmitting the third data packet to the second microcontroller; and
by the second microcontroller:
in response to receiving the third data packet, accessing the fourth safety state information in the second payload;
accessing fifth safety state information representing a fifth safety state of the input device at a third time succeeding the second time;
in response to detecting a difference between the fourth safety state information and the fifth safety state information, accessing sixth safety state information representing a sixth safety state of the input device at a fourth time succeeding the third time, a duration spanning the third time to the fourth time equaling the threshold duration; and
in response to detecting a difference between the fourth safety state information and the sixth safety state information, transmitting a message to the sink device to enter a fault state.

11. The method of claim 1:
further comprising generating, by the first microcontroller, the payload comprising a first sequence number and safety state information representing the first safety state of the input device; and
wherein generating the first error detecting code value based on the payload comprises generating the first error detecting code value based on the first sequence number and the safety state information.

12. The method of claim 11:
further comprising, by the second microcontroller, in response to receiving the first data packet, modifying the payload to generate a modified payload comprising a second sequence number and the safety state information;
wherein generating the second error detecting code value based on the payload comprises generating the second error detecting code value based on the safety state information and the second sequence number; and
wherein generating the second data packet comprises generating the second data packet comprising the modified payload, the first error detecting code value, and the second error detecting code value.

13. The method of claim 1, wherein generating the first error detecting code value comprises generating the first error detecting code value based on the payload indicating the first safety state of the input device and the first key, the input device comprising an emergency stop button coupled to the first microcontroller and the second microcontroller.

14. The method of claim 1, wherein controlling the mode of operation of the sink device based on the payload comprises controlling the mode of operation of the sink device based on the payload, the sink device comprising a robot.

15. A method comprising:
at a source device comprising a first microcontroller and a second microcontroller:
generating, by the first microcontroller, a first error detecting code value based on a payload, indicating a first safety state of an input device, and a first key associated with the first microcontroller;
generating, by the first microcontroller, a first data packet comprising the payload and the first error detecting code value;
transmitting the first data packet from the first microcontroller to the second microcontroller;
generating, by the second microcontroller, a second error detecting code value based on the payload and a second key associated with the second microcontroller;
generating, by the second microcontroller, a second data packet comprising the payload, the first error detecting code value, and the second error detecting code value; and
transmitting the second data packet to a sink device over a communication channel; and
at the sink device comprising a third microcontroller, pre-programmed with the first key associated with the first microcontroller, and a fourth microcontroller pre-programmed with the second key associated with the second microcontroller:
in response to receiving the second data packet, extracting the payload from the second data packet to generate an extracted payload;
appending, by the third microcontroller, the first key to the extracted payload;

generating, by the third microcontroller, a third error detecting code value based on the extracted payload and the first key associated with the first microcontroller;

appending, by the fourth microcontroller, the second key to the extracted payload;

generating, by the fourth microcontroller, a fourth error detecting code value based on the extracted payload and the second key associated with the second microcontroller; and commanding the sink device to enter a fault state in response to detecting a difference between the first error detecting code value and the third error detecting code value.

16. The method of claim 15:

further comprising, at the sink device:

commanding the sink device to enter the fault state in response to detecting a difference between the second error detecting code value and the fourth error detecting code value.

17. A method comprising:

at a source device comprising a first microcontroller and a second microcontroller:

generating, by the first microcontroller, a first error detecting code value based on a payload, indicating a first safety state of an input device, and a first key associated with the first microcontroller;

generating, by the first microcontroller, a first data packet comprising the payload and the first error detecting code value;

transmitting the first data packet from the first microcontroller to the second microcontroller;

generating, by the second microcontroller, a second error detecting code value based on the payload and a second key associated with the second microcontroller;

generating, by the second microcontroller, a second data packet comprising the payload, the first error detecting code value, and the second error detecting code value; and transmitting the second data packet to a sink device over a communication channel; and at the sink device comprising a third microcontroller, pre-programmed with the first key associated with the first microcontroller, and a fourth microcontroller pre-programmed with the second key associated with the second microcontroller:

in response to receiving the second data packet, extracting the payload from the second data packet to generate an extracted payload;

appending, by the third microcontroller, the first key to the extracted payload;

generating, by the third microcontroller, a third error detecting code value based on the extracted payload and the first key associated with the first microcontroller;

appending, by the fourth microcontroller, the second key to the extracted payload;

generating, by the fourth microcontroller, a fourth error detecting code value based on the extracted payload and the second key associated with the second microcontroller; and commanding the sink device to enter a fault state in response to detecting a difference between the second error detecting code value and the fourth error detecting code value.

\* \* \* \* \*